(12) United States Patent
Hettiger

(10) Patent No.: US 7,195,557 B2
(45) Date of Patent: Mar. 27, 2007

(54) DISCHARGE ARRANGEMENT OF AN AGRICULTURAL HARVESTING MACHINE

(75) Inventor: Marcus Hettiger, Saarbrücken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/177,720

(22) Filed: Jul. 8, 2005

(65) Prior Publication Data
US 2006/0019732 A1    Jan. 26, 2006

(30) Foreign Application Priority Data
Jul. 20, 2004  (DE) ...................... 10 2004 035 158

(51) Int. Cl.
*A01F 12/30* (2006.01)
(52) U.S. Cl. ..................................... 460/111
(58) Field of Classification Search ................ 460/111, 460/114, 115; 141/198, 231; 414/345
See application file for complete search history.

(56) References Cited

U.S. PATENT DOCUMENTS

| | | | |
|---|---|---|---|
| 2,465,156 A | * | 3/1949 | Huddle .......................... 406/39 |
| 2,778,510 A | * | 1/1957 | Mayhill et al. ................ 406/39 |
| 3,251,631 A | * | 5/1966 | Hennen ....................... 406/161 |
| 4,221,508 A | * | 9/1980 | Haines ......................... 406/41 |
| 4,300,726 A | | 11/1981 | Phillips, II et al. |
| 5,558,282 A | * | 9/1996 | Ameye et al. ................ 241/60 |
| 6,638,159 B2 | * | 10/2003 | Krone et al. ................ 460/114 |

FOREIGN PATENT DOCUMENTS

| | | |
|---|---|---|
| CA | 2 089 211 | 8/1994 |
| DE | 196 41 211 | 9/1996 |
| DE | 101 34 137 | 7/2001 |
| DE | 102 11 706 | 3/2002 |
| EP | 1 040 745 | 10/2000 |

* cited by examiner

*Primary Examiner*—Árpád Fábián Kovács

(57) ABSTRACT

The invention concerns the discharge arrangement of an agricultural harvesting machine with a lower ejection tower connected to the frame of the harvesting machine and an ejection elbow that includes the outlet end of the discharge arrangement supported in bearings, free to rotate, relative to the ejection tower by a slewing rim about a substantially vertical axis of rotation. A removable intermediate element is removably inserted between the ejection tower and the ejection elbow, the surface of the intermediate element that is in contact with the ejection tower and the surface in contact with the slewing rim extend at an angle to each other.

8 Claims, 5 Drawing Sheets

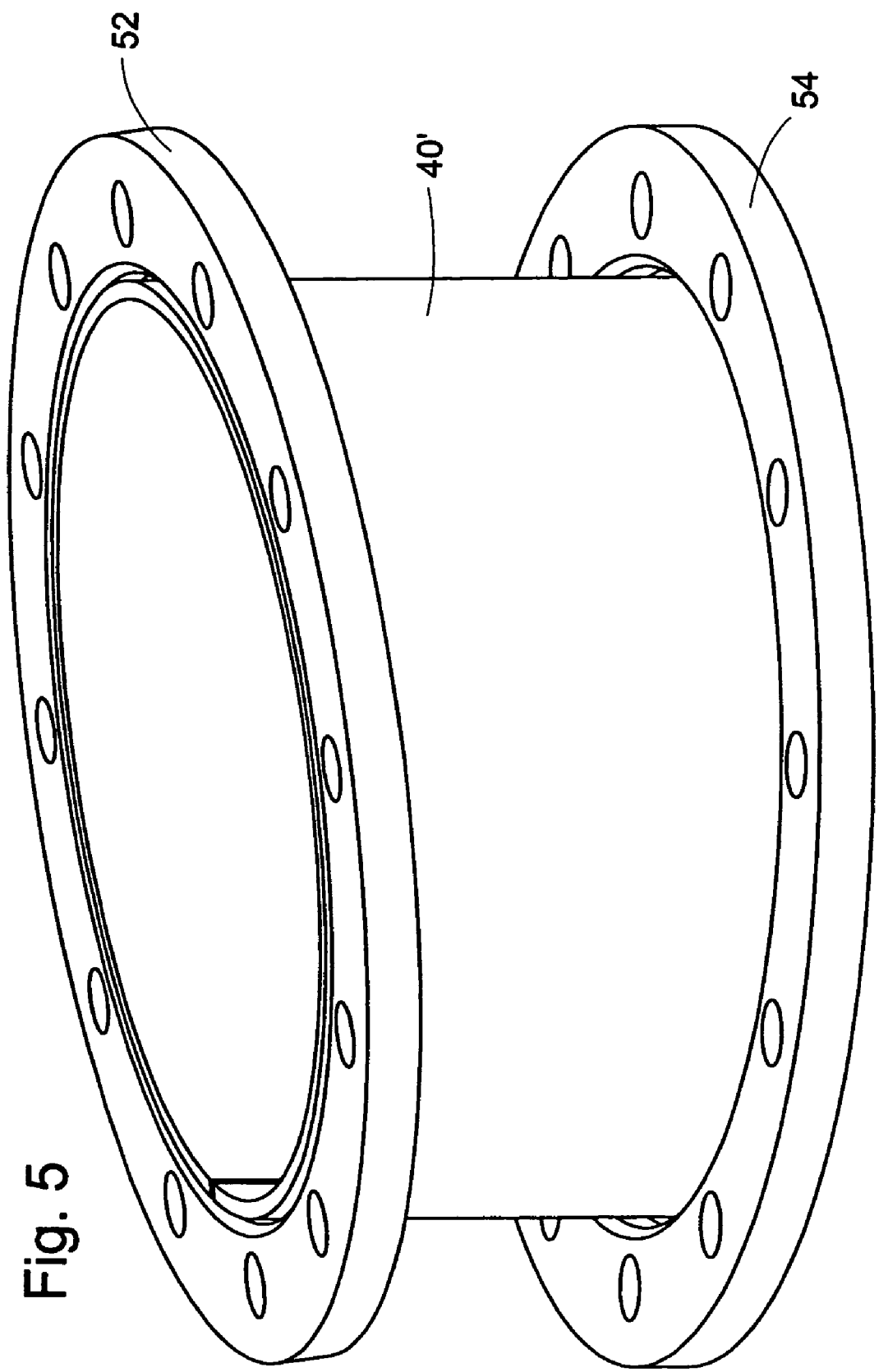

DISCHARGE ARRANGEMENT OF AN AGRICULTURAL HARVESTING MACHINE

BACKGROUND

1. Field of the Invention

The invention generally relates to an agricultural harvesting machine.

2. Background of the Invention

During the harvest of agricultural crops on a field, it is common practice for a harvesting machine to deposit harvested crop on a transport vehicle operating alongside of the harvesting machine. The transport vehicle, for example, a tractor with a trailer or a truck, is loaded by means of a discharge arrangement of the harvesting machine. The movable part of the discharge arrangement is also known as an ejection elbow, ejection bow or a transfer arrangement, and is supplied with harvested crop from below by an ejection tower. As a rule, the ejection elbow is fastened to the harvesting machine, free to rotate, about a vertical axis, and can be pivoted between a rest position, in which it is oriented approximately parallel to the longitudinal axis of the harvesting machine, and an operating position, in which it extends transverse to the direction of operation of the harvesting machine. In addition, the height of the outlet end of the discharge arrangement can be varied, as well as the position of an ejection flap that defines the angle at which the harvested crop is delivered.

In some types of forage harvesters the axis of rotation of the discharge arrangement is not exactly vertical, but is inclined to the rear at a certain angle in order to increase the possible range of rotation of the discharge arrangement without collision with the operator's cab. Thereby in the case of such forage harvesters, the height of the outlet end of the discharge arrangement changes during a rotation of the discharge arrangement about the vertical axis, which is a particular disadvantage with transport vehicles that must be filled from the side, since a manual repositioning of the height of the outlet end of the discharge arrangement may be required after a rotation of the discharge arrangement about the vertical axis.

It has been proposed that the length of the discharge arrangement be varied in order to make it conform to the transport vehicle used and/or to the particular front harvesting attachment. For this purpose the discharge arrangement may be composed of individual sections that can be selected as required or the discharge end is attached so that it can be slid in the longitudinal direction. However, since the extension elements are always arranged downstream of the pivot bearing arrangement of the discharge arrangement, they do not change the orientation of the axis of rotation.

Furthermore, it is known practice to insert separate pivot bearings into the discharge arrangement by means of which the discharge arrangement can be pivoted into a lowered position for operation on public roads. Here, too, the orientation of the vertical or nearly vertical axis of rotation of the discharge arrangement remains constant during the operation.

The problem underlying the invention is seen in the need to define the discharge arrangement of a harvesting machine that can be repositioned by simple means between an inclined orientation of the axis of rotation, that makes a larger range of rotation possible, to a vertical axis of rotation, particularly in order to avoid a repositioning of the height of the discharge end, for the loading of transport vehicles from the side.

SUMMARY

The ejection tower is connected to the frame of the harvesting machine. The slewing rim supports the ejection elbow of the discharge arrangement, free to rotate, about an exactly vertical axis or an approximately vertical axis on the ejection tower. It is proposed that a removable intermediate element be attached between the ejection tower and the slewing rim. The intermediate element is provided with a surface fastened to the ejection tower and a surface fastened to the slewing rim. The two surfaces are oriented with respect to each other in such a way that when the intermediate element is installed, an angle exists between the longitudinal axis of the ejection tower and the axis of rotation of the slewing rim.

In this way a simple rebuilding procedure permits the orientation of the axis of rotation of the slewing rim to be changed, that is, by an assembly or removal of the intermediate element. The intermediate element can be assembled during the manufacture of the harvesting machine or it can be inserted or exchanged in a subsequent modification.

As a rule the upper edge or the upper side of the ejection tower is arranged orthogonally to its longitudinal axis. Then the two surfaces of the intermediate element extend at an angle to each other and the slewing rim is arranged in a plane that extends at an angle to the upper edge of the ejection tower.

In order to attain the largest possible range of angles of rotation of the discharge arrangement about the vertical axis without a collision with the operator's cab, an obvious solution is to equip the ejection tower with a longitudinal axis that is inclined to the horizontal by an angle of, for example 8°, in a direction opposite to the direction of operation and to arrange the upper edge or the upper end surface of the ejection tower orthogonally to its longitudinal axis. If the slewing rim is mounted on the upper end surface of the ejection tower directly or over an intermediate element that is provided with end surfaces extending parallel to each other, then the axis of rotation of the slewing rim also extends inclined to the rear by this same angle. Thereby the result is the desired inclination of the axis of rotation inclined to the rear. If, on the other hand, the angled intermediate element is mounted with an angle of inclination to the front between its end surfaces then the result is a horizontal end surface of the intermediate element and an exactly vertical axis of the slewing rim, which makes a filling of the transport vehicles from the side easier. Otherwise it would also be conceivable to have the angles of the ejection tower and the intermediate element add to each other by rotating the intermediate element through 180°. Thereby the result is an axis of rotation that is inclined even further to the rear, increasing the possible pivoting range of the discharge arrangement, but where the height of the ejection end of the discharge arrangement depends to an even greater extent on the angle of rotation.

In an alternate embodiment, the longitudinal axis of the ejection tower could be arranged exactly vertically so that its upper edge extends horizontally. Without an intermediate element or with an intermediate element, whose end surfaces extending parallel to each other, the result then is a vertical axis of rotation of the stewing rim. The axis of rotation inclined to the rear can be attained by installation of the angled intermediate element described.

As mentioned above, a straight intermediate element with end surfaces extending parallel to each other in place of the angled intermediate element could be inserted between the lower section of the discharge arrangement and the rotary bearing arrangement. With appropriate dimensioning the height of the slewing rim and of the discharge arrangement remains generally independent of the orientation of the axis of rotation of the slewing rim. A drive for the rotation of the upper section of the discharge arrangement about the axis of rotation of the slewing rim is most appropriately supplied by flexible connection means, particularly hoses, for the supply of a hydraulic motor or flexible cables for the drive of an electric motor from the energy source on board the harvesting machine.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a perspective view of the angled intermediate element shown in FIG. 3.

DESCRIPTION OF THE EMBODIMENTS

Figure 1:
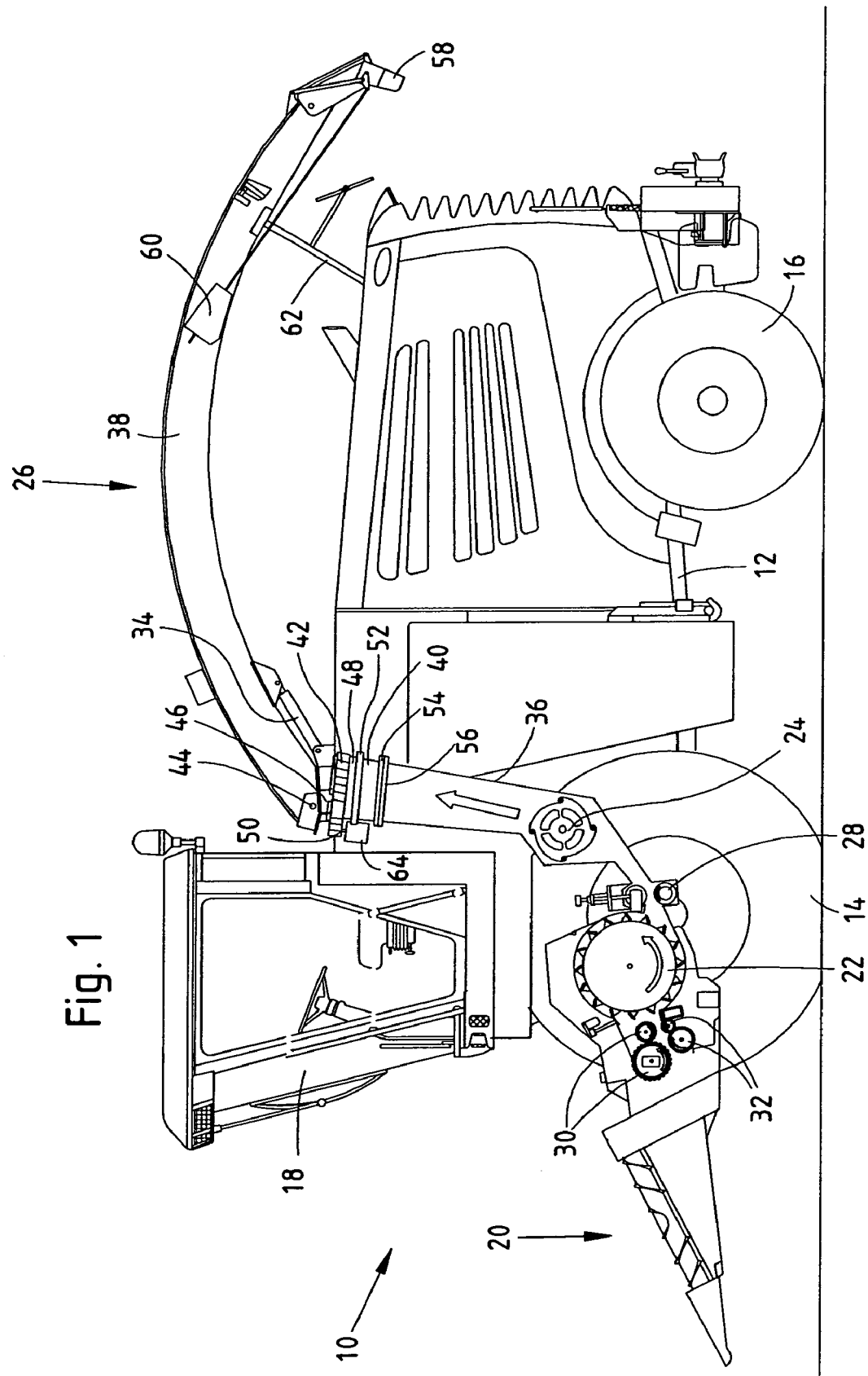
FIG. 1 is a schematic side view of a harvesting machine.

A harvesting machine 10 shown in FIG. 1 in the form of a self-propelled forage harvester is supported on a frame 12 that is carried by driven front wheels 14 and steerable rear wheels 16. The harvesting machine 10 is controlled from an operator's cab 18 from which a crop recovery arrangement 20 can be controlled visually. Crop taken up from the ground by the crop recovery arrangement 20, a corn head in the embodiment shown, for example, corn, cereal crop or the like, is conducted to a chopper drum 22 by upper rough pressing rolls 30 and lower rough pressings rolls 32, where it is chopped into small pieces and delivered to a conveyor arrangement 24. The crop leaves the harvesting machine 10 to an accompanying trailer over a rotating discharge arrangement 26. A post-chopper reduction arrangement 28 extends between the chopper drum 22 and the conveyor arrangement 24, through which the crop to be conveyed is conducted tangentially to the conveyor arrangement 24.

The discharge arrangement 26 is composed of a lower section and an upper section, that can be moved with respect to the lower section. The lower section includes an ejection tower 36 that extends upward immediately downstream of the conveyor arrangement 24. An intermediate element 40 is fastened to the upper end of the ejection tower 36, the upper side of the intermediate element in turn carries a slewing rim 42. The slewing rim 42 carries the upper section of the discharge arrangement 26, that is configured in the form of an ejection elbow 38.

As can be seen in FIG. 1, the ejection elbow 38 can be pivoted by an actuator 34 at its lower end about a horizontal axis 44 (depending on the rotational position of the ejection elbow 38 about the vertical axis). A retainer arrangement 46 with a bearing journal defining the axis 44, to which the ejection elbow 38 is pivotally connected, free to rotate, extends between each of the lower side wall regions of the ejection elbow 38 and the slewing rim 42. The slewing rim 42 is composed of an inner pipe-shaped element that is fastened to a lower flange 48 and an outer ring gear, to which the retainer 46 is fastened, and that is supported by bearings, free to rotate, relative to the inner element of the slewing rim 42 about the longitudinal axis of the slewing rim 42. The support bearings of the outer ring gear on the inner element can be provided by ball bearings as are described by U.S. Pat. No. 3,844,632 A, whose disclosure is incorporated by reference into the present document. The ring gear is provided with gear teeth on its circumference. A gear 50 or a worm gear, not shown, meshes with the gear teeth of the ring gear, it can be brought into rotation by a hydraulically or electrically driven actuator 64 in form of a motor. Thereby the ring gear of the slewing rim 42 and with it the retainer 46 and the ejection elbow 38 can be rotated about an almost vertical axis that is inclined slightly to the rear opposite to the direction of operation of the harvesting machine 10.

The flange 48 that is fastened to the underside of the inner element of the stewing rim 42 is connected by screws to a flange 52 on the upper side of the pipe-shaped intermediate element 40. A further flange 54 is attached to the underside of the pipe-shaped intermediate element 40, and is connected to a flange 56 that is fixed to the upper side of the ejection tower 36. The flanges 52, 54 are connected to each other by reinforcing ribs 66, they are also welded to the outside of the pipe-shaped body of the intermediate element 40. Such reinforcing ribs 66 can also be attached to the intermediate element 40', as shown in FIG. 5.

Figure 2:
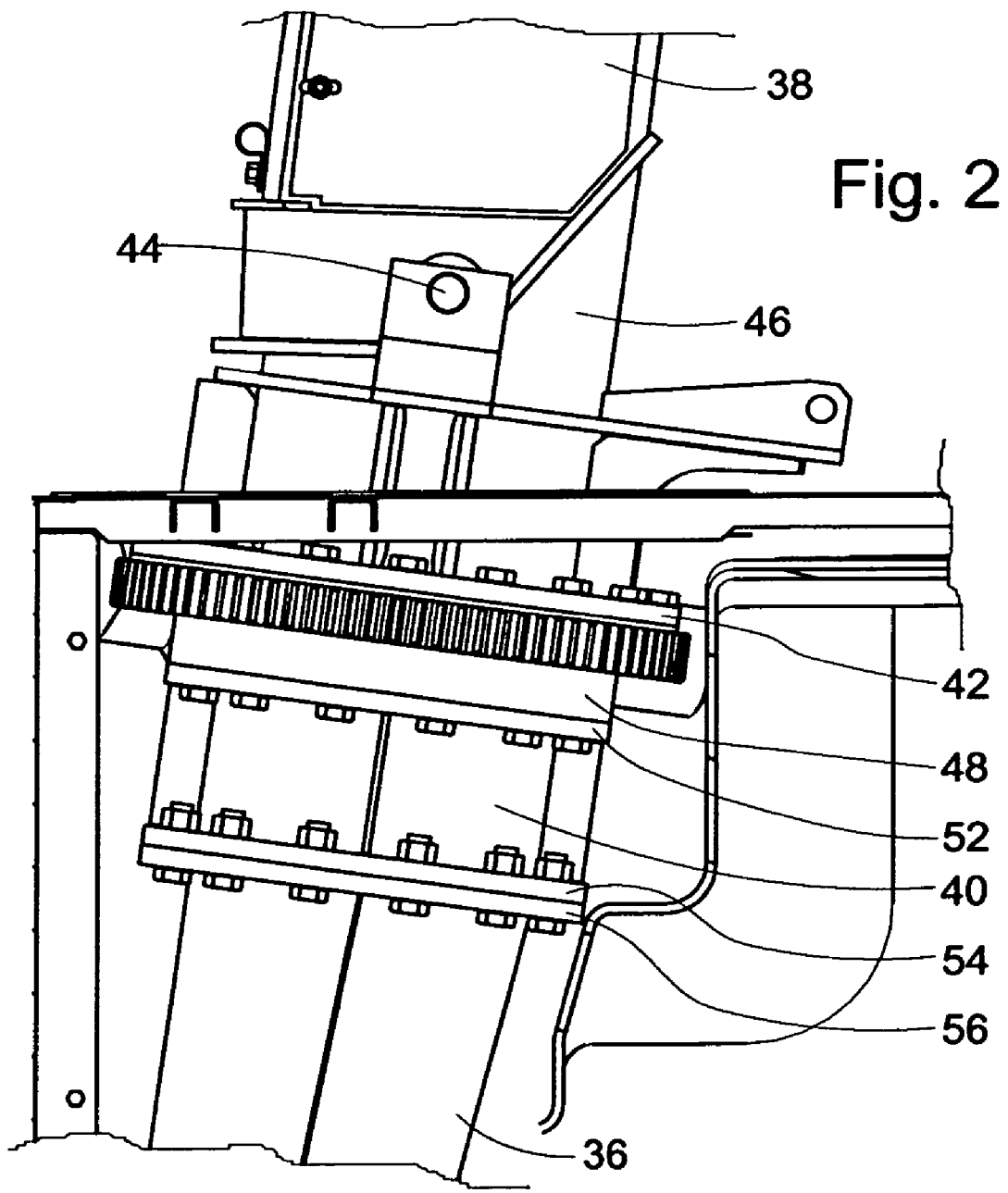
FIG. 2 is an enlarged section of FIG. 1 showing the upper section of the ejection tower, an intermediate element with parallel end surfaces, the stewing rim and the lower region of the ejection elbow.

The ejection tower 36 is fastened in turn to the housing of the conveyor arrangement 24 and/or directly to the frame 12. The inner stationary element of the slewing rim 42 can also be fixed to the frame 12. The flanges 48, 52, and 54, 56 and the surfaces defined by their lower edges or their upper edges are all oriented parallel to each other. The longitudinal axes of the ejection tower 36 and the intermediate element 40 as well as the axis of rotation of the slewing rim 42 extend coaxially and approximately vertically but inclined slightly to the rear opposite to the direction of operation of the harvesting machine 10, as can be seen particularly in FIGS. 1 and 2.

The ejection elbow 38 has a cross section of an inverted U and is therefore generally open downward. There is no loss of harvested crop due to this feature, since the harvested crop slides along the inner surface of the upper side of the sheet metal cover of the ejection elbow 38 under centrifugal force and is guided in the sideways direction by the sheet metal sides of the ejection elbow 38. Moreover a pivoted ejection flap 58 is pivotally connected at the outlet end of the ejection elbow 38, whose position can be varied by an actuator 60.

Thereby the actuators 34, 60 and 64 permit a repositioning of the position of the ejection elbow 38, in order to define the direction at which the harvested crop strikes the transport vehicle. The actuator 64 rotates the ejection elbow 38 about an axis extending approximately in the vertical direction, while the actuator 34 defines the height of the outlet end by pivoting about the approximately horizontal axis 44. The direction of ejection at that point is defined by the ejection flap 58 that can be moved by the actuator 60. The control of the actuators 34, 64 and 60 can be performed by an operator in the operator's cab 18 by means of appropriate input devices. There is also the possibility of indicating preprogrammed positions or to automatically direct the ejection elbow 38 by appropriate sensors, so that the harvested crop reaches the transport vehicle. In the position shown in FIG. 1, the outlet end of the ejection elbow 38 rests on a deposit arrangement 62 at the rear end of the harvesting machine 10, this is a stand composed of pipes. This position can be used for the operation on a field, in case no harvesting operation is performed at that point, or for operation on public roads.

As mentioned previously, the longitudinal axes of the ejection tower 36 and the intermediate element 40 as well as the axis of rotation of the slewing rim 42 are not exactly vertical but inclined slightly to the rear by an angle of approximately 80°. Thereby a somewhat larger range of rotary angles can be obtain for the ejection elbow 38 about the axis of rotation of the stewing rim 42, but this has the disadvantage that the height of the outlet end of the ejection elbow 38 changes during the rotation about the stewing rim 42. In most harvesting machines this disadvantage is acceptable since the transport vehicles in most cases are filled from above.

Figure 3:
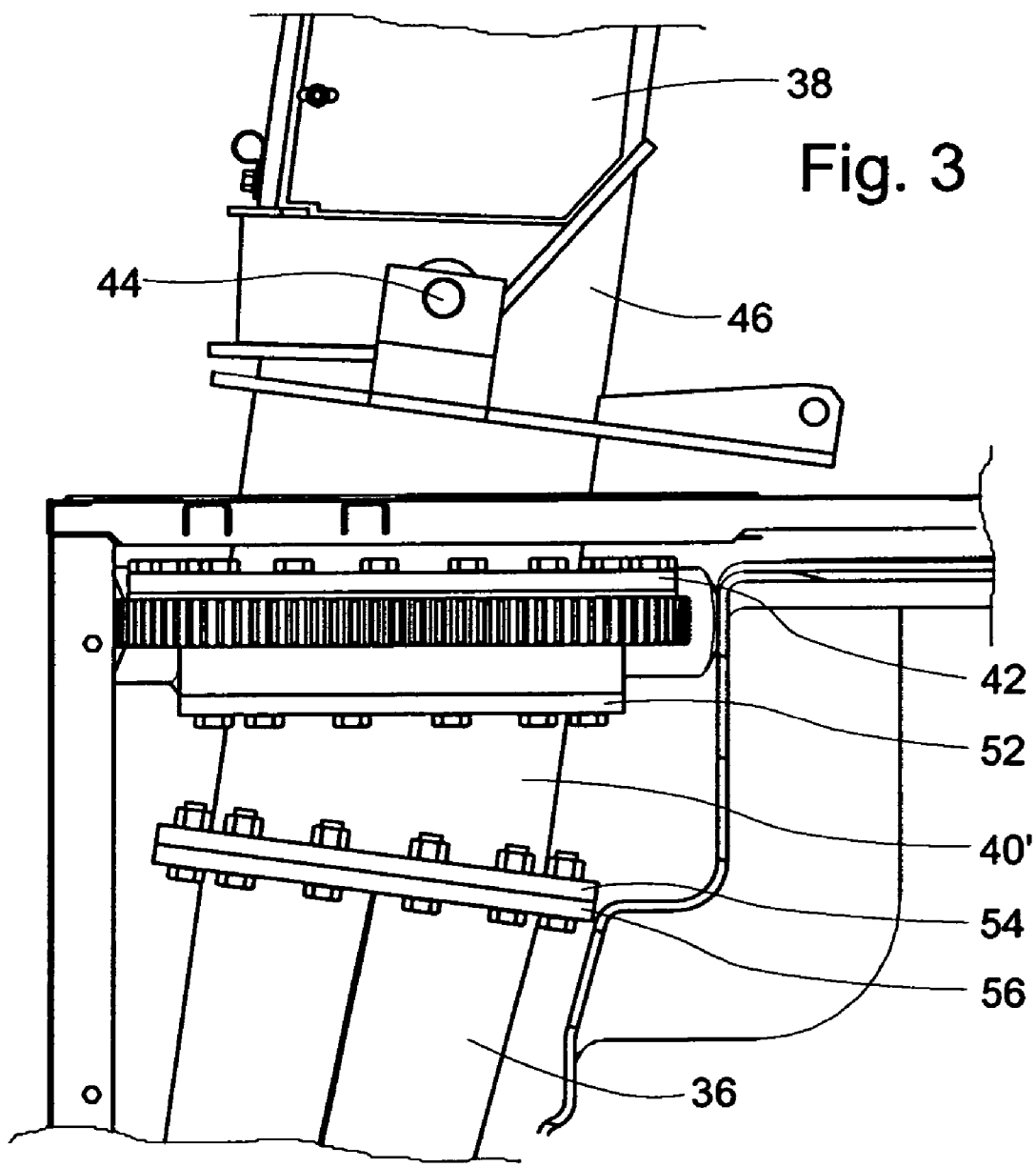
FIG. 3 is a view similar to FIG. 2, wherein an intermediate element with end surfaces arranged at an angle is used.
Figure 4:
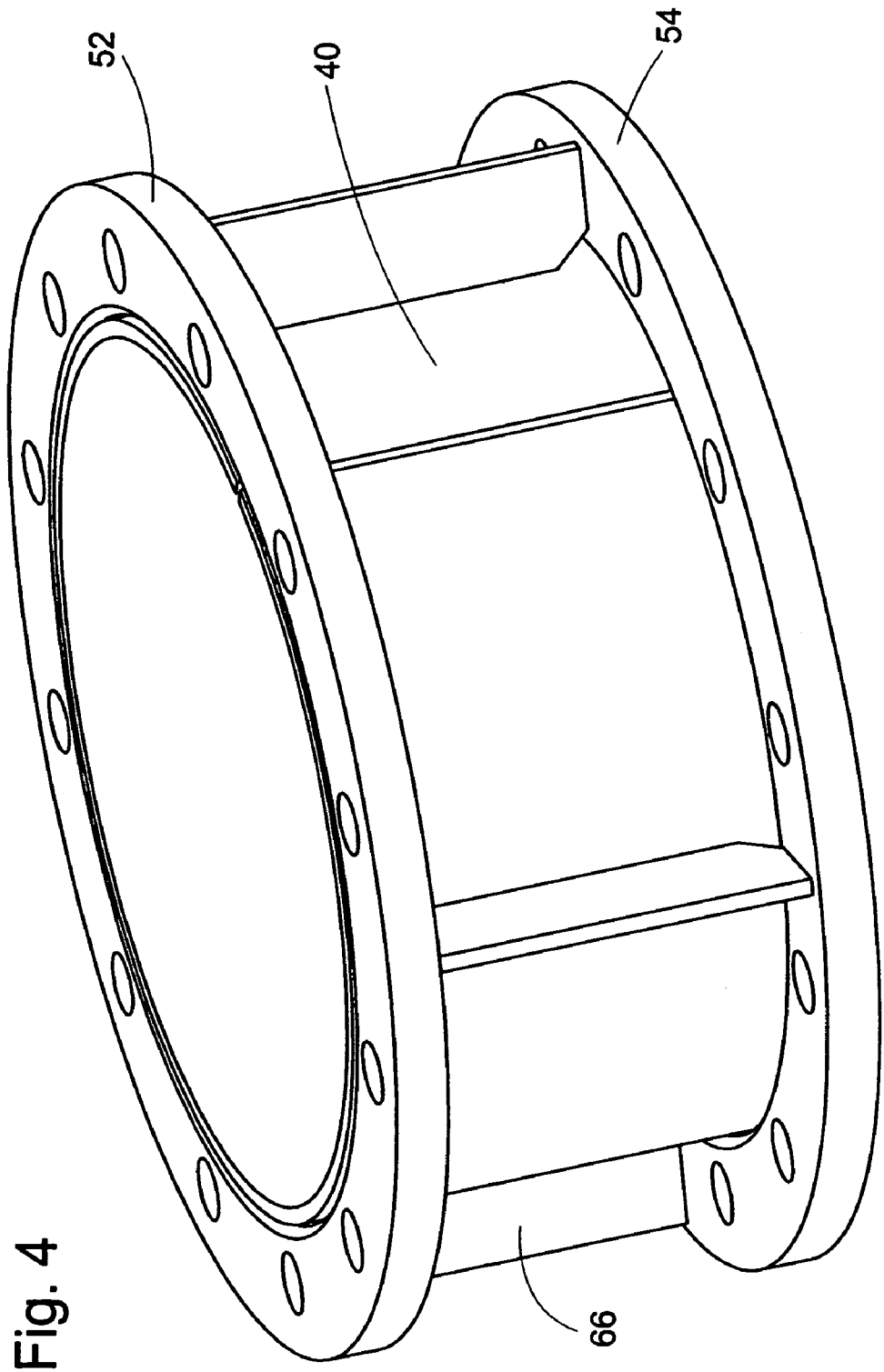
FIG. 4 is a perspective view of the intermediate element shown in FIG. 2.

In some areas, however, the transport vehicles, as a rule, are filled from the side. Referring to FIGS. 3 and 5, in order to avoid the dependence of the height of the outlet end of the ejection elbow 38 upon the angle of rotation, in those cases, it is proposed that an intermediate element 40' be used, whose flanges 52, 54 extend in planes that are directed at angles, in place of the intermediate element 40 shown in FIGS. 1, 3 and 4 with flanges 52, 54 extending parallel to each other. The angle between the flanges 52, 54 of the angled intermediate element corresponds to the angle of inclination of the longitudinal axis of the ejection tower 36 and the angle of the flange 56 to the horizontal, since the flange 56 extends orthogonally to the longitudinal axis of the ejection tower 36. While the longitudinal axis of the ejection tower 36 extends at an inclination to the rear, the angle between the flanges 52, 54 is directed to the front. Thereby the result is that the upper flange 52 of the intermediate element 40 is directed horizontally in the installed condition. Accordingly the slewing rim 42 that is mounted to it rotates about an axis of rotation that extends vertically, such that the height of the outlet end of the ejection elbow 38 is independent of the angle of rotation of the slewing rim 42, which simplifies the filling of transport vehicles from the side.

The particular intermediate element 40 or 40' can already be mounted during the manufacture of the harvesting machine 10 or it can be provided subsequently as a retrofit depending on the desire of the customer. The invention can also be used on combines with pivoted grain tank unloading screw conveyors that can be repositioned in height, particularly with those having a non-vertical pivot axis.

In accordance with the provisions of the patent statutes, the present invention has been described in what is considered to represent its preferred embodiment. However, it should be noted that the invention can be practiced otherwise than as specifically illustrated and described.

What is claimed is:

1. A discharge arrangement for an agricultural harvesting machine comprising:
   a lower ejection tower connected to a frame of the harvesting machine;
   an upper ejection elbow that includes an outlet end of a discharge arrangement that is free to rotate relative to the ejection tower about a substantially vertical rotational axis via a slewing rim; and
   a removable intermediate element configured to be selectively inserted between and interconnecting the ejection tower and the ejection elbow, a surface of the intermediate element that is in contact with the ejection tower and an opposite surface of the intermediate element that is in contact with the slewing rim being oriented at an angle relative to each other such that a longitudinal axis of the ejection tower and the axis of rotation of the slewing rim extend at an angle relative to one another.

2. The discharge arrangement according to claim 1, wherein said angle between the surface of the intermediate element in contact with the ejection tower and the surface of the intermediate element that is in contact with the slewing rim coincides with said angle between the longitudinal axis of the ejection tower and the axis of rotation of the slewing rim.

3. The discharge arrangement according to claim 1, wherein an upper edge of the ejection tower is inclined to the rear at an angle that is opposite to the direction of operation and that coincides with the angle between the surfaces of the intermediate element, the two angles being angled in opposite directions.

4. The discharge arrangement according to claim 1, wherein the surface of the intermediate element that is in contact with the ejection tower and the surface of the intermediate element that is in contact with the slewing rim are parallel to one another.

5. A harvesting machine with a discharge arrangement, wherein the discharge arrangement includes a lower ejection tower connected to a frame of the harvesting machine, an upper ejection elbow that includes an outlet end of a discharge arrangement that is free to rotate relative to the ejection tower about a substantially vertical rotational axis via a slewing rim, and a removable intermediate element that can be selectively inserted between and interconnecting the ejection tower and the ejection elbow, a surface of the intermediate element that is in contact with the ejection tower and an opposite surface of the intermediate element that is in contact with the slewing rim being oriented at an angle relative to each other such that a longitudinal axis of the ejection tower and an axis of rotation of the slewing rim extend at an angle relative to one another.

6. A discharge arrangement for an agricultural harvesting machine comprising:
   a lower ejection tower connected to a frame of the harvesting machine;
   an upper ejection elbow that includes an outlet end of the discharge arrangement that is free to rotate relative to the ejection tower about a substantially vertical rotational axis via a slewing rim, and
   a removable intermediate element configured to be selectively inserted between and interconnecting the ejection tower and the ejection elbow, with a surface of the intermediate element that is in contact with the ejection tower and an opposite surface of the intermediate element that is in contact with the slewing rim are oriented at an angle relative to each other such that a longitudinal axis of the ejection tower and the axis of rotation of the slewing rim extend at an angle relative to one another.

7. The discharge arrangement according to claim 6, wherein the angle between the surface of the intermediate element in contact with the ejection tower and the surface of the intermediate element that is in contact with the slewing rim coincides with an angle between the longitudinal axis of the ejection tower and the axis of rotation of the slewing rim.

8. The discharge arrangement according to claim 6, wherein an upper edge of the ejection tower is inclined to the rear at an angle that is opposite to the direction of operation and coincides with the angle between the surfaces of the intermediate element, the two angles being angled in opposite directions.

* * * * *